(12) United States Patent
Ishizuka et al.

(10) Patent No.: US 12,275,456 B2
(45) Date of Patent: Apr. 15, 2025

(54) HOOD STRUCTURE FOR VEHICLE

(71) Applicant: MAZDA MOTOR CORPORATION, Hiroshima (JP)

(72) Inventors: Kozo Ishizuka, Aki-gun (JP); Kazuhiko Mori, Aki-gun (JP); Kouichi Matsumoto, Aki-gun (JP); Hiroshi Mizuguchi, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 323 days.

(21) Appl. No.: 17/938,382

(22) Filed: Oct. 6, 2022

(65) Prior Publication Data

US 2023/0117169 A1    Apr. 20, 2023

(30) Foreign Application Priority Data

Oct. 19, 2021  (JP) ................. 2021-170900

(51) Int. Cl.
*B62D 25/12*       (2006.01)
(52) U.S. Cl.
CPC .................. *B62D 25/12* (2013.01)
(58) Field of Classification Search
CPC ....... B62D 25/12; B62D 25/105; B62D 25/10
USPC ....................................................... 180/69.2
See application file for complete search history.

(56) References Cited

U.S. PATENT DOCUMENTS

| 9,868,472 | B2 * | 1/2018 | Takada | .................. | B62D 25/105 |
| 2016/0083019 | A1 * | 3/2016 | Takada | .................... | B60R 21/34 |
| | | | | | 296/193.11 |
| 2017/0282978 | A1 * | 10/2017 | Yoshida | ............... | B62D 25/105 |
| 2018/0072262 | A1 * | 3/2018 | Nakasako | ............ | B62D 25/105 |

FOREIGN PATENT DOCUMENTS

| CN | 109911024 A | 6/2019 |
| DE | 10 2015 011326 A1 | 3/2016 |
| JP | H11-321714 A | 11/1999 |
| JP | 2016-060395 A | 4/2016 |
| JP | 2020-128169 A | 8/2020 |

OTHER PUBLICATIONS

The extended European search report issued by the European Patent Office on Feb. 14, 2023, which corresponds to European Patent Application No. 17/938,382-1009 and is related to U.S. Appl. No. 17/938,382.

* cited by examiner

*Primary Examiner* — James A Shriver, II
*Assistant Examiner* — Hilary L Johns
(74) *Attorney, Agent, or Firm* — Studebaker Brackett PLLC (57) ABSTRACT

A hood structure for a vehicle ensures rigidity of a front portion of an outer panel and a high level of pedestrian protection. The hood structure includes an outer panel defining external appearance; an inner panel on a prime mover chamber side of the outer panel; and a stiffener in a front portion of the inner panel. The inner panel has an upper surface section on a center side of the outer panel; a coupling surface section extending downward from a ridgeline located at a peripheral edge of the upper surface section; and a lower surface section extending from a peripheral edge end of the coupling surface section to an edge side of the outer panel. The stiffener has a reinforcing surface section joined to the outer panel; and a rear-side fixed section extending rearward from the reinforcing surface section and fixed to the vicinity of the ridgeline.

12 Claims, 8 Drawing Sheets

HOOD STRUCTURE FOR VEHICLE

TECHNICAL FIELD

The present disclosure relates to a hood structure for a vehicle, the hood structure including an outer panel that defines external appearance, an inner panel that is provided on a prime mover chamber side of the outer panel, and a stiffener that is provided to a front portion of the inner panel.

BACKGROUND

Conventionally, a hood structure for a vehicle has been known which includes an outer panel (in detail, a hood outer panel) that defines external appearance, an inner panel (in detail, a hood inner panel) that is provided on a prime mover chamber side, such as an engine compartment side, of the outer panel, and a stiffener that is provided to a front portion of the inner panel, as shown in Japanese Patent Document JP-A-2020-128169.

The above-described inner panel includes an upper surface section that is located on a center side of the outer panel; and a coupling surface section that extends downward from a peripheral edge end of this upper surface section and is inclined in a front-low, rear-high state. The stiffener is fixed to the coupling surface section of the above-described inner panel, so as to secure outer plate rigidity by the stiffener. During pedestrian protection, an upper surface of the stiffener moves downward to absorb energy when receiving an impact load from above. In this way, it is configured to reduce a reaction force generated to a colliding object.

However, improvement is desired for pedestrian protection performance of the hood front portion in a vehicle which is high, for example. There is room for further improvement in the conventional structure disclosed in JP-A-2020-128169.

SUMMARY

In view of the above, the present disclosure has a purpose of providing a hood structure for a vehicle capable of simultaneously securing outer panel rigidity of a front portion of an outer panel and securing pedestrian protection performance at a high level.

The present disclosure provides a hood structure for a vehicle, and the hood structure includes an outer panel that defines external appearance; an inner panel that is provided on a prime mover chamber side of the outer panel; and a stiffener that is provided in a front portion of the inner panel. The inner panel has an upper surface section that is located on a center side of the outer panel; a coupling surface section that extends downward from a ridgeline located at a peripheral edge of the upper surface section; and a lower surface section that extends from a peripheral edge end of the coupling surface section to an edge side of the outer panel. The stiffener has a reinforcing surface section that is joined to the outer panel; and a rear-side fixed section that extends rearward from the reinforcing surface section. The rear-side fixed section is fixed to the vicinity of the ridgeline.

In a case of an engine-driven vehicle, the above-described prime mover chamber is an engine compartment. In a case of an electric car, the above-described prime mover chamber is a motor chamber. According to the present disclosure, during normal time (non-collision time), the stiffener is fixed to the vicinity of the ridgeline.

Thus, it is possible to improve support rigidity of the outer panel and thereby prevent deformation of the outer panel, for example, when a user touches the outer panel, or the like, to apply a downward load to the outer panel.

Meanwhile, when an impact load is applied during pedestrian protection, the ridgeline can be deformed via the stiffener. Thus, it is possible to increase an energy absorption amount not only through energy absorption achieved by deformation of the stiffener but also by deformation of the inner panel. That is, it is possible to simultaneously secure outer panel rigidity of a front portion of the outer panel and pedestrian protection performance at a high level.

An aspect of the present disclosure may include a front-side fixed section that extends forward from the reinforcing surface section. It may be formed such that a vertical distance between the rear-side fixed section and the reinforcing surface section is longer than a vertical distance between the front-side fixed section and the reinforcing surface section.

According to the present disclosure, during pedestrian protection, moment that presses the rear-side fixed section downward and rearward is generated with a front side on the reinforcing surface section side of the rear-side fixed section being an origin, and a rotational force is generated by this moment. Thus, it is possible to promote the deformation of the inner panel by pressing the inner panel downward. Therefore, it is possible to increase the energy absorption amount.

According to an aspect of the present disclosure, the rear-side fixed section may be provided at the same position as the front-side fixed section in a vehicle width direction. According to the present disclosure, the rear-side fixed section and the front-side fixed section are present at the same position in the vehicle width direction. Therefore, it is possible to reliably transmit the load to the rear-side fixed section during pedestrian protection, to concentrate stress on the rear-side fixed section.

According to an aspect of the present disclosure, the reinforcing surface section may be joined to the inner panel via a bent section in a rear portion of the reinforcing surface section. According to the present disclosure, the reinforcing surface section is provided to an inner panel portion, rigidity of which is improved by the ridgeline, via the bent section. Therefore, it is possible to prevent the deformation of the reinforcing surface section and the outer panel during the normal time.

According to an aspect of the present disclosure, the plural rear-side fixed sections may be separated from each other in the vehicle width direction, and may be formed such that positions in a front-rear direction of the bent sections in the plural rear-side fixed sections match each other in the vehicle width direction. According to the present disclosure, during pedestrian protection, it is possible to transmit the load to the rear-side fixed sections via the bent sections all at once, so as to concentrate the stress on the vicinity of the ridgeline. In this way, it is possible to increase the energy absorption amount by stably deforming the inner panel downward.

According to an aspect of the present disclosure, a joint seat surface, to which the rear-side fixed section is joined, may be formed to continue with the ridgeline of the inner panel. According to the present disclosure, the joint seating surface is connected to the ridgeline. Thus, it is possible to reliably transmit the load to the ridgeline via the joint seat surface during the pedestrian protection. In other words, it is possible to reliably transmit the load to the ridgeline by making the joint seat surface continue with the ridgeline.

According to an aspect of the present disclosure, the ridgeline may have an interrupted section that is interrupted at a position of the joint seat surface, and the joint seat surface may be provided on a virtual extension line of the ridgeline in the interrupted section of the ridgeline. According to the present disclosure, the load can further reliably be transmitted from the joint seat surface to the ridgeline. Thus, it is possible to deform the ridgeline via the stiffener during the pedestrian protection, secure the energy absorption by the deformation of the inner panel in addition to the energy absorption by the deformation of the stiffener, and thereby increase the energy absorption amount.

The present disclosure simultaneously ensures rigidity of a front portion of an outer panel and a high level of pedestrian protection performance.

DETAILED DESCRIPTION

A purpose of simultaneously ensuring the outer panel rigidity of the front portion of the outer panel and ensuring pedestrian protection performance at a high level is achieved by a configuration that includes an outer panel defining external appearance; an inner panel provided on a prime mover chamber side of the outer panel; and a stiffener provided in a front portion of the inner panel, in which the inner panel has an upper surface section located on a center side of the outer panel; a coupling surface section extending downward from a ridgeline located at a peripheral edge of the upper surface section; and a lower surface section extending from a peripheral edge end of the coupling surface section to an edge side of the outer panel, in which the stiffener has a reinforcing surface section joined to the outer panel; and a rear-side fixed section extending rearward from the reinforcing surface section, and in which the rear-side fixed section is fixed to the vicinity of the ridgeline.

Figure 1:
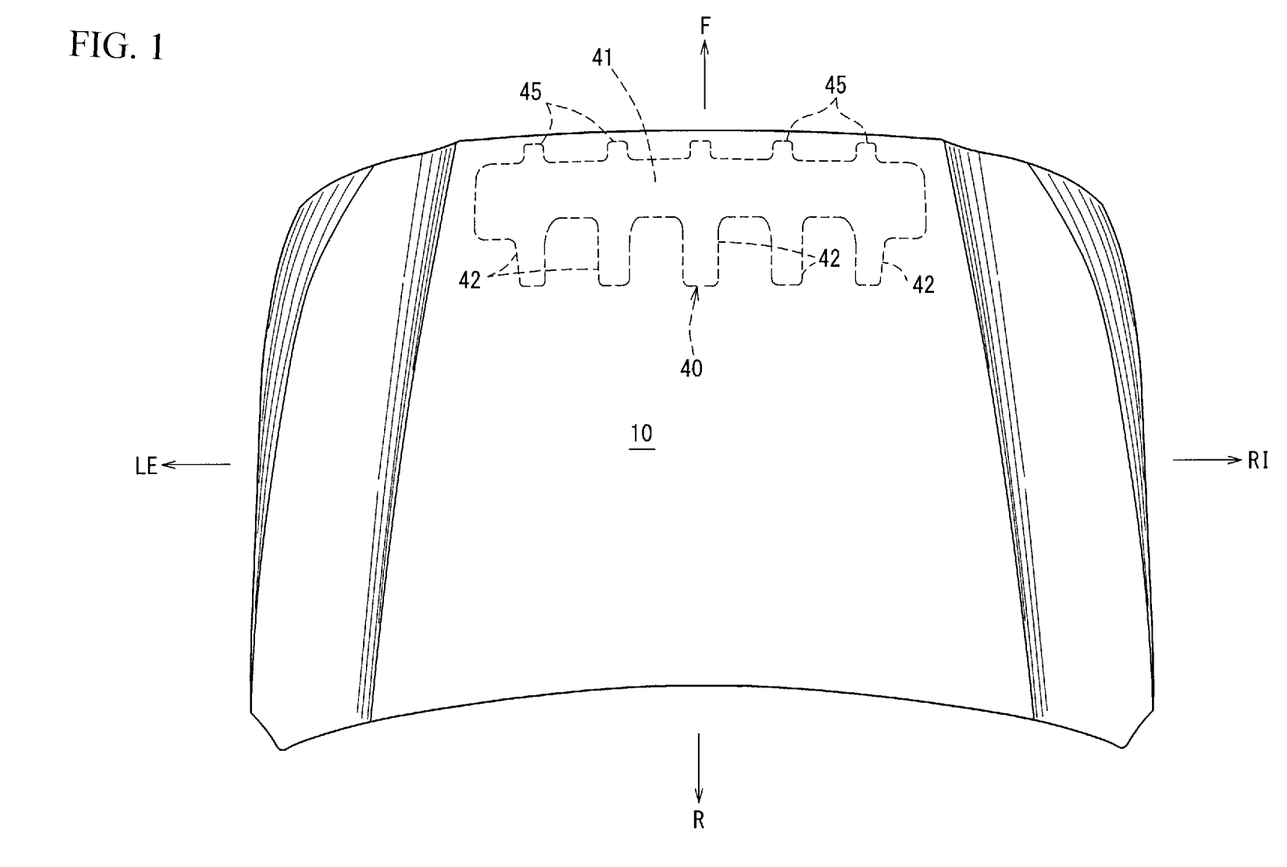
FIG. 1 is a plan view of a hood structure for a vehicle.
Figure 2:
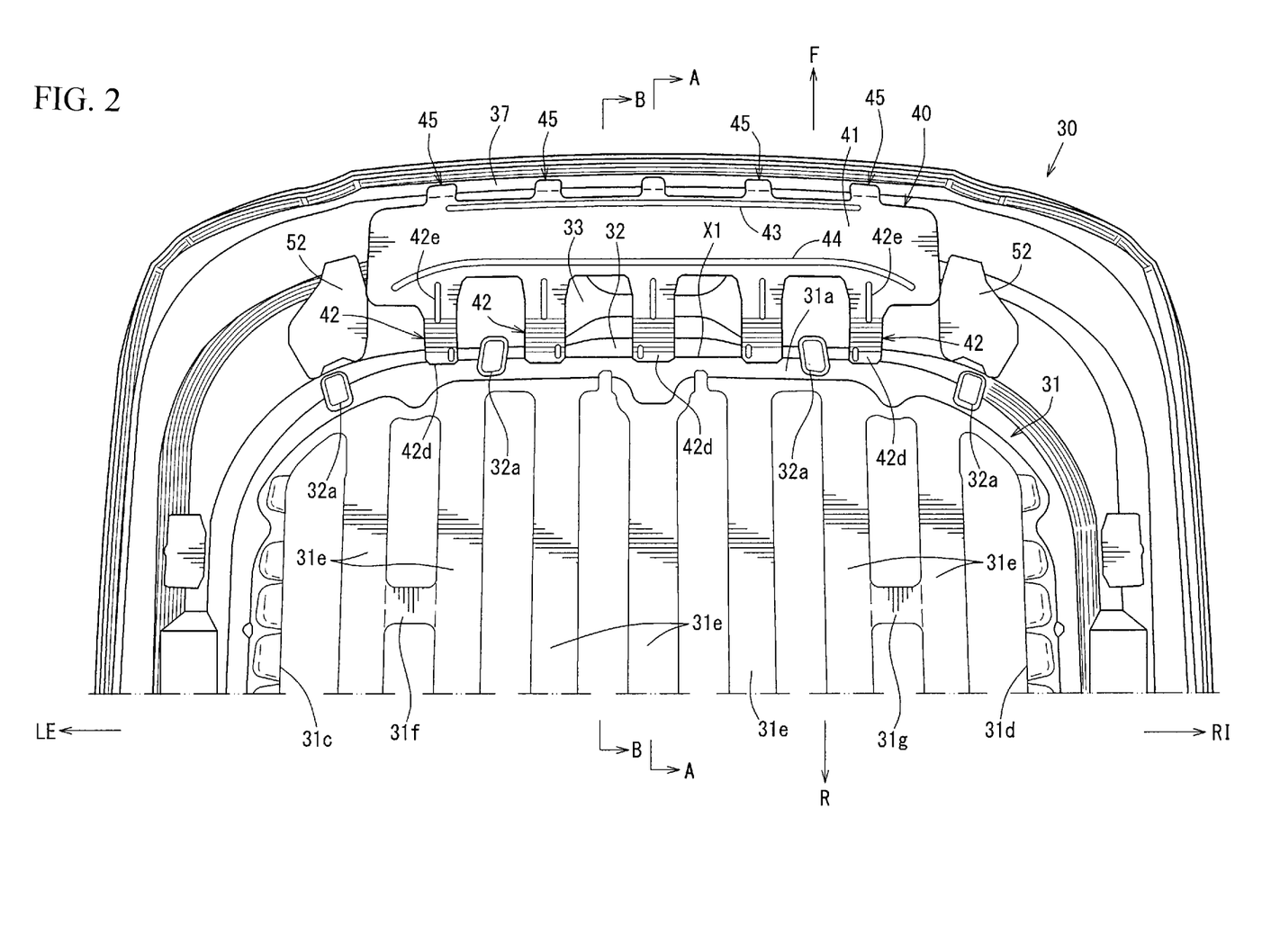
FIG. 2 is a plan view of a front-half portion of the hood structure illustrated with an outer panel removed.
Figure 3:
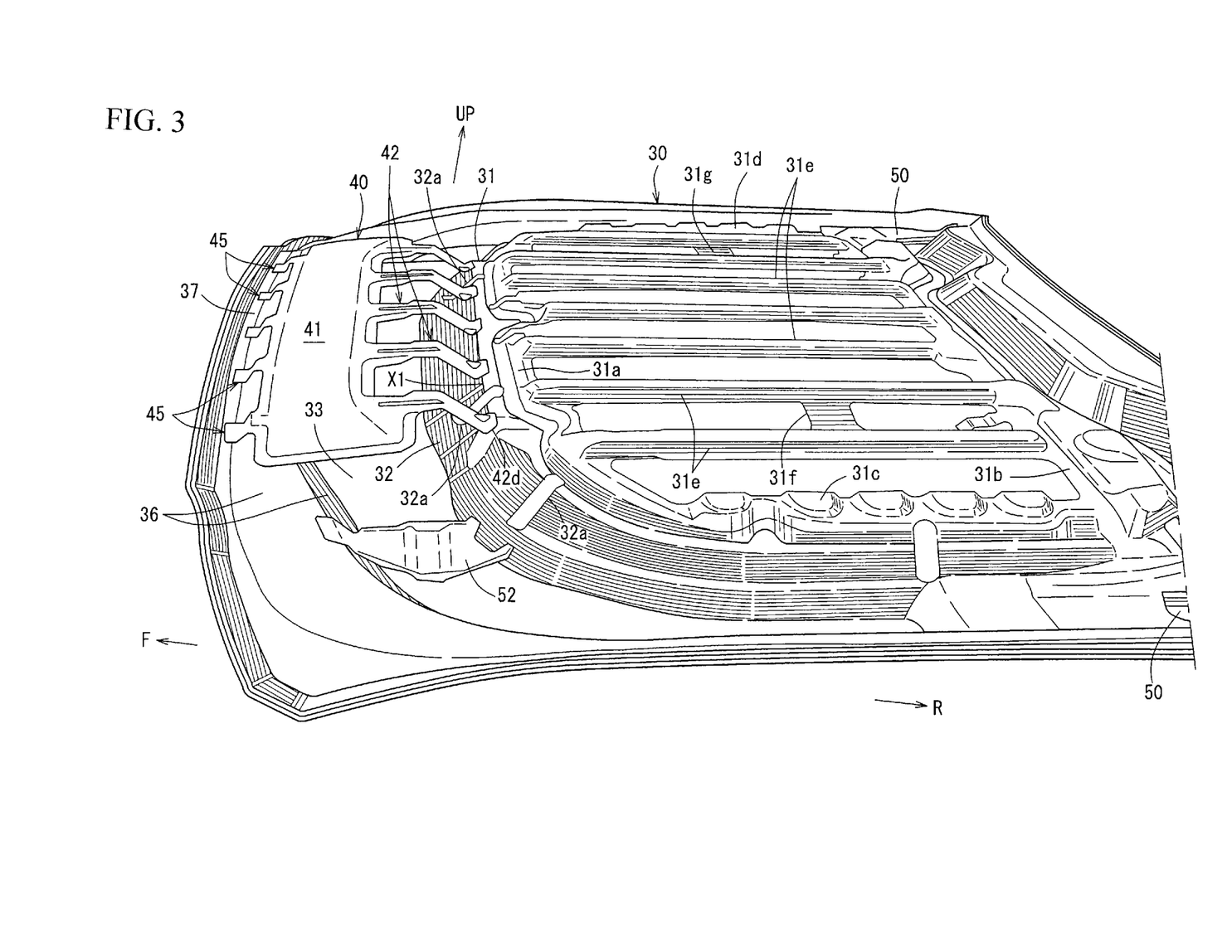
FIG. 3 is a perspective view of the hood structure for a vehicle illustrated with the outer panel removed.

A detailed description will hereinafter be made on an embodiment of the present disclosure with reference to the drawings. A hood structure for a vehicle is illustrated in the drawings. FIG. 1 is a plan view illustrating the hood structure for a vehicle. FIG. 2 is a plan view of a front-half portion of the hood structure illustrated in a state where an outer panel is removed. FIG. 3 is a perspective view of the hood structure for a vehicle illustrated in the state where the outer panel is removed.

Figure 4:
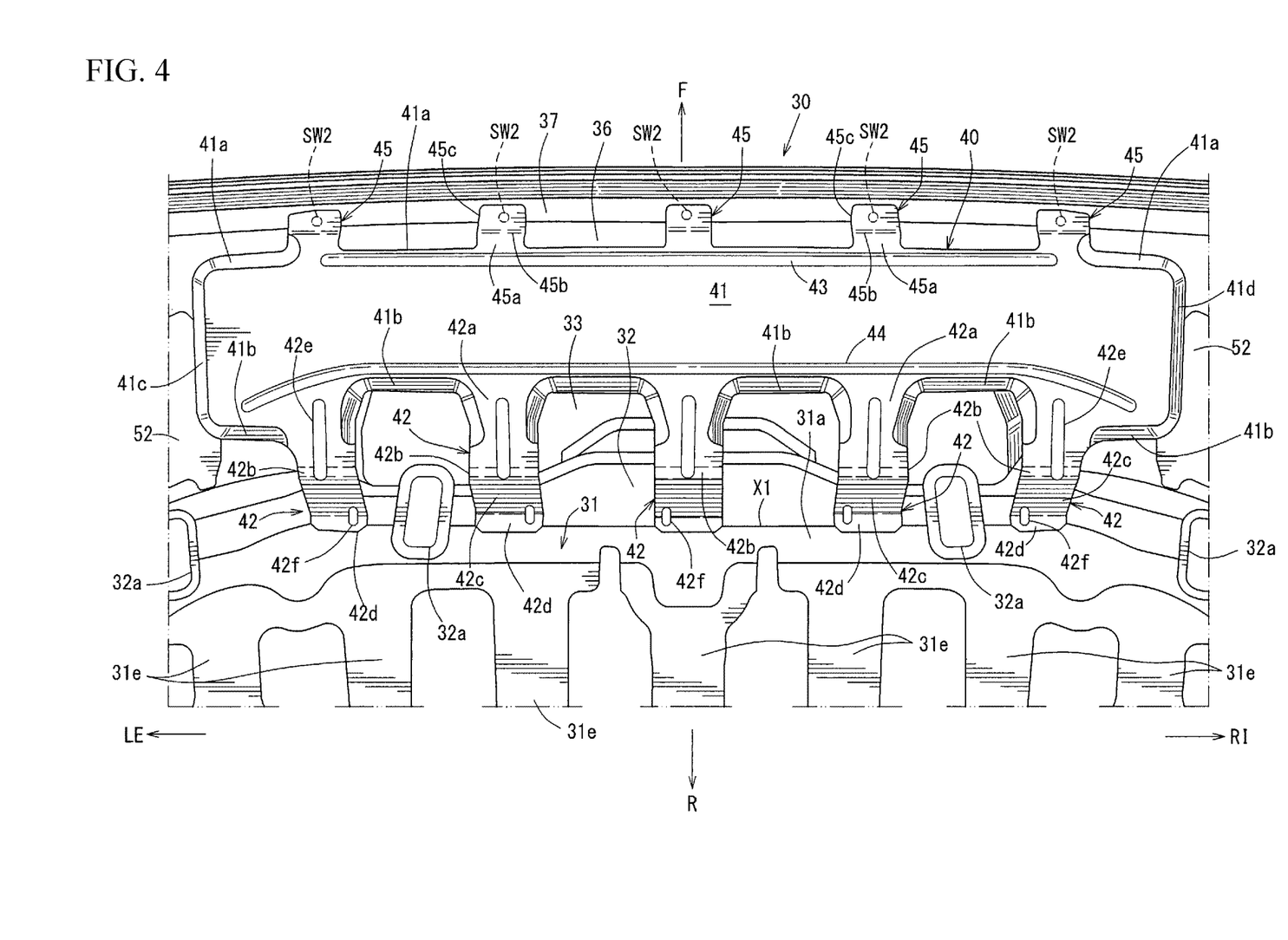
FIG. 4 is an enlarged plan view of a main section of FIG. 2.
Figure 5:
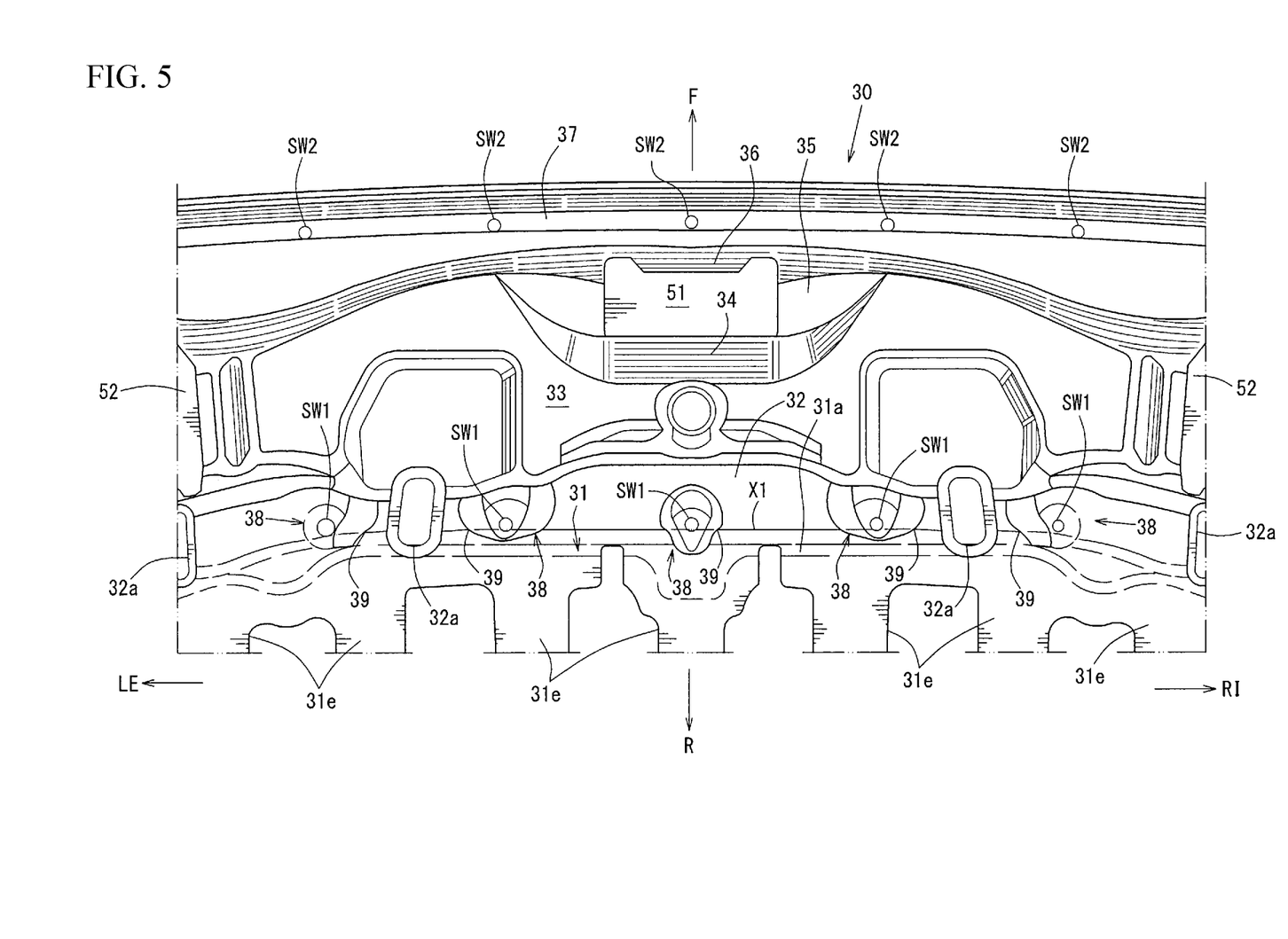
FIG. 5 is an enlarged plan view of a main section of an inner panel with a stiffener removed from FIG. 4.
Figure 6:
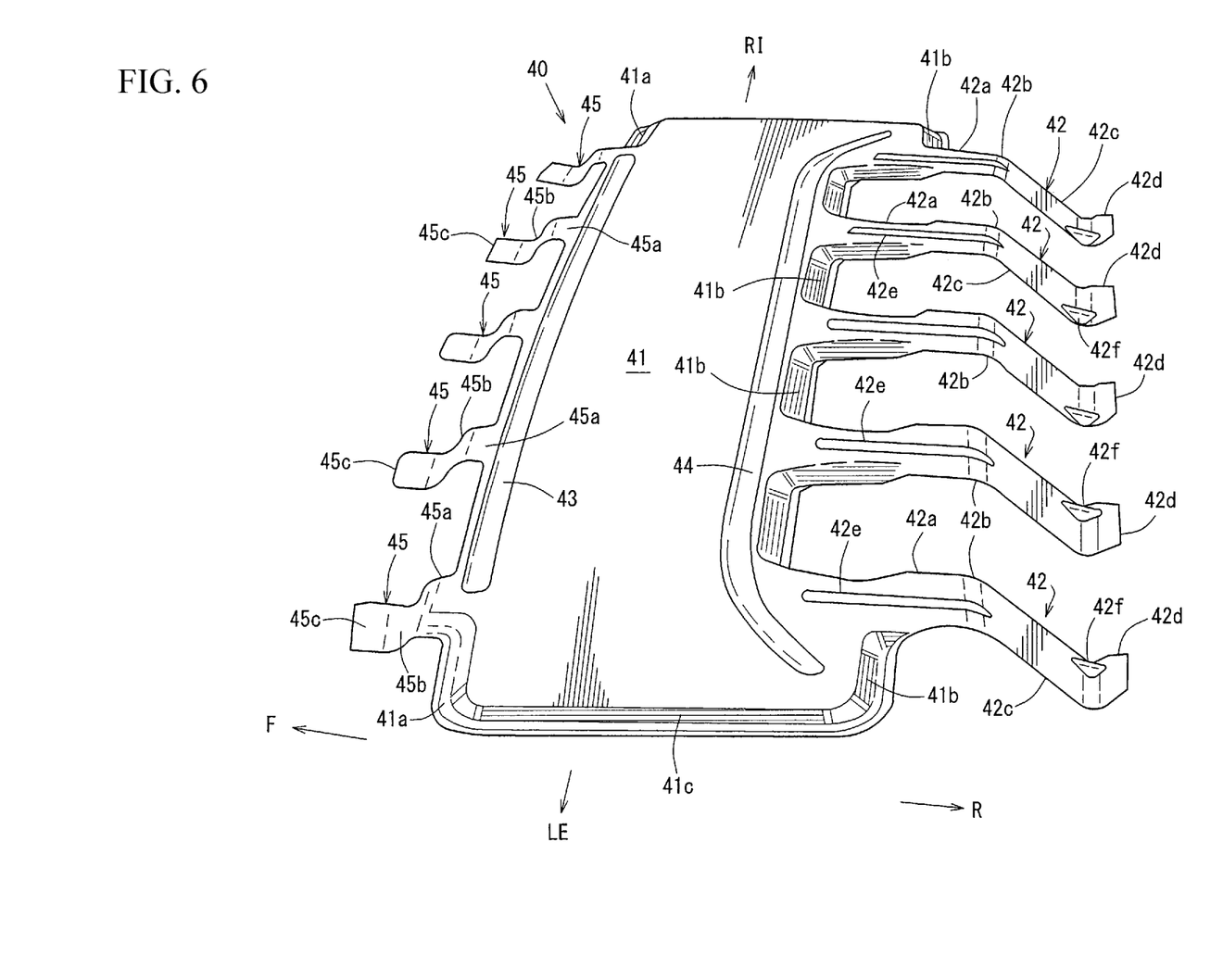
FIG. 6 is a perspective view of the stiffener.
Figure 7:
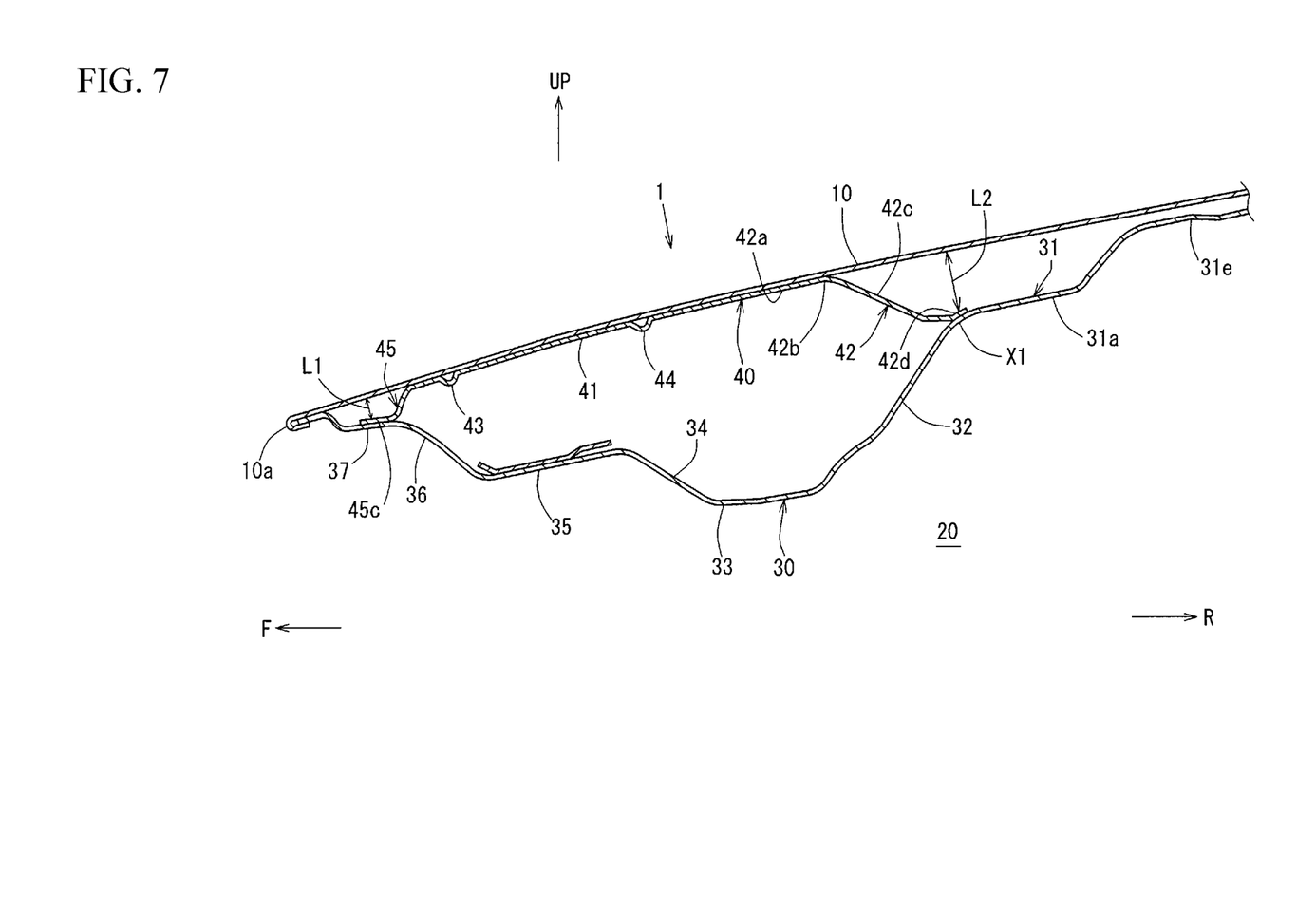
FIG. 7 is a cross-sectional view taken along arrow A-A in FIG. 2 including the outer panel.
Figure 8:
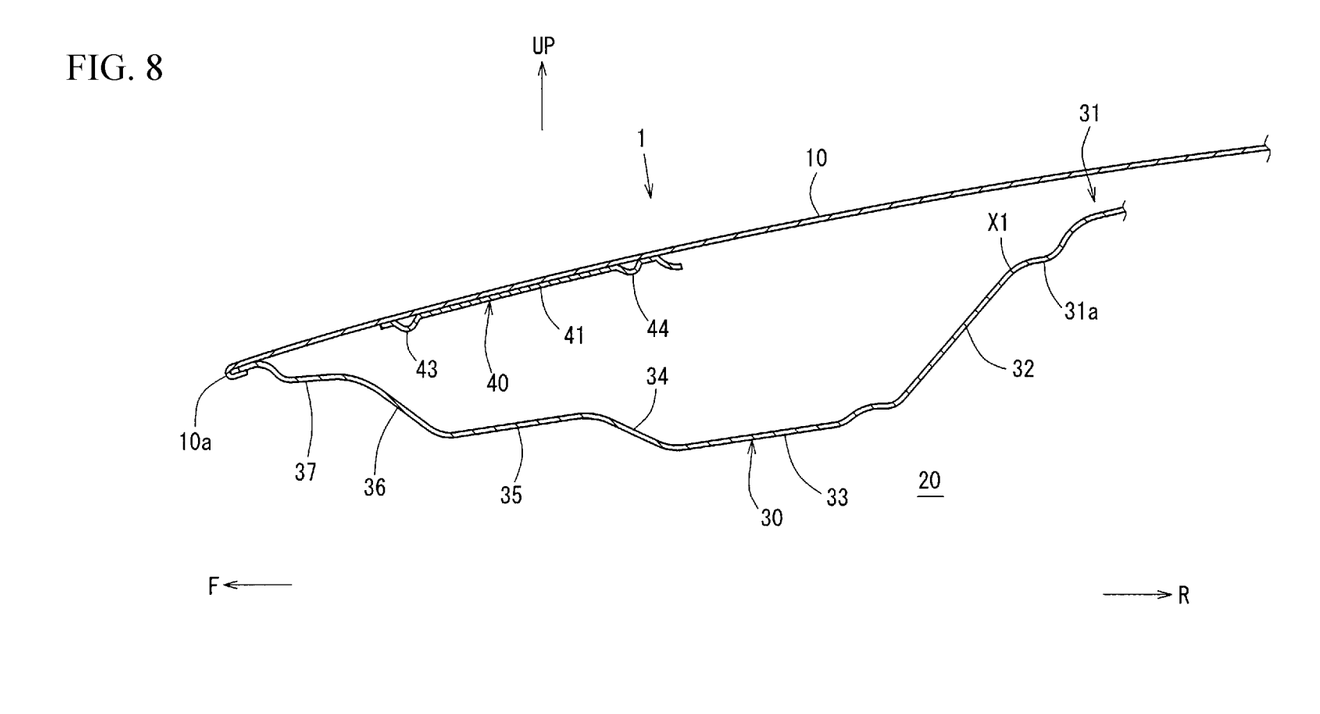
FIG. 8 is a cross-sectional view that is taken along arrow B-B in FIG. 2 including the outer panel.

FIG. 4 is an enlarged plan view of a main section in FIG. 2. FIG. 5 is an enlarged plan view of a main section of an inner panel in a state where a stiffener is removed from FIG. 4. FIG. 6 is a perspective view of the stiffener. FIG. 7 is a cross-sectional view that is taken along arrow A-A FIG. 2. FIG. 8 is a cross-sectional view that is taken along arrow B-B in FIG. 2.

As illustrated in FIG. 1, FIG. 7, and FIG. 8, a hood structure 1 for a vehicle includes an outer panel 10 (in detail, a hood outer panel) that defines external appearance, an inner panel 30 (in detail, a hood inner panel) that is provided on a prime mover chamber 20 side of the outer panel 10, and a stiffener 40 that is provided to a front portion of the inner panel 30. In the case where a vehicle is an engine-driven vehicle, the prime mover chamber 20 is set as an engine compartment. In the case where the vehicle is an electric car, the prime mover chamber 20 is set as a motor chamber.

The outer panel 10 and the inner panel 30 described above are integrally formed by hemming a peripheral edge of the outer panel 10. It is configured that both of these panels 10, 30 cover an upper portion of the prime mover chamber 20 from above in an openable/closable manner. In this embodiment, it is configured that a front side of a hood is opened/closed with a rear end side of the hood being a fulcrum.

The above-described inner panel 30 has: an upper surface section 31 that is located on a center side of the outer panel 10, that is, a center side in a vehicle front-rear direction and a vehicle width direction of the outer panel 10; a coupling surface section 32 that extends downward from a ridgeline X1 located at a peripheral edge of the upper surface section 31; and a lower surface section 33 that extends to an edge 10a side of the outer panel 10 from a peripheral edge end of the coupling surface section 32 (see FIG. 7).

As illustrated in FIG. 3, the upper surface section 31 of the inner panel 30 includes: a front side section 31a that extends in the vehicle width direction in a front portion of the upper surface section 31; and a rear side section 31b that extends in the vehicle width direction in a rear portion of the upper surface section 31. In addition, the upper surface section 31 includes right and left lateral side sections 31c, 31d that respectively couple right and left ends in the vehicle width direction of the front side section 31a and the rear side section 31b in the vehicle front-rear direction (see FIG. 2 and FIG. 3).

Furthermore, the above upper surface section 31 includes plural beam sections 31e that couple the front side section 31a and the rear side section 31b in the vehicle front-rear direction at spaced intervals in the vehicle width direction (see FIG. 2 and FIG. 3). An upper surface of each of these beam sections 31e and the right and left lateral side sections 31c, 31d is fixed to a lower surface of the outer panel 10 by an adhesive, which is not illustrated.

Moreover, a coupling piece section 31f and a coupling piece section 31g are provided. The coupling piece section 31f couples the beam section 31e, which is located on a far-left side in the vehicle width direction of the plural beam sections 31e, and the beam section 31e, which is adjacent to such a beam section 31e, in the vehicle width direction. The coupling piece section 31g couples the beam section 31e, which is located on a far-right side in the vehicle width direction of the plural beam sections 31e, and the beam section 31e, which is adjacent to such a beam section 31e, in the vehicle width direction.

As illustrated in FIG. 3, FIG. 4, and FIG. 5, the above-described coupling surface section 32 is provided with plural openings 32a for a lightweight purpose. The plural openings 32a are provided in an area that includes the coupling surface section 32 and the front side section 31a of the upper surface section 31, and are provided at spaced intervals in the vehicle width direction.

As illustrated in FIG. 7 and FIG. 8, the inner panel 30 has a stiffener support surface section 37 via a front-side coupling surface section 34, an intermediate surface section 35, and an inclined surface section 36 from a peripheral edge end of the above-described lower surface section 33. The stiffener support surface section 37 extends to the edge 10a side of the outer panel 10.

As illustrated in FIG. 7 and FIG. 8, at a center position in the vehicle width direction of the inner panel 30 (a position in the cross section that is taken along arrow A-A) and an offset position near such a position (a position in the cross section that is taken along arrow B-B), the above-described coupling surface section 32 is inclined in a front-low, rear-high state where the coupling surface section 32 is inclined downward to the front and upward to the rear.

In the center position in the vehicle width direction (the position in the cross section that is taken along arrow A-A) and the offset position near such a position (a position in the cross section that is taken along arrow B-B), the above-described front-side coupling surface section 34 and the inclined surface section 36 described above are inclined in a front-high, rear-low state where the above-described front-side coupling surface section 34 and the inclined surface section 36 are inclined upward to the front and downward to the rear (see FIG. 7 and FIG. 8).

In addition, each of the front side section 31a of the upper surface section 31 described above, the intermediate surface section 35, and the stiffener support surface section 37 is formed to be parallel with or substantially parallel with a portion at an opposing position in the lower surface of the outer panel 10 (see FIG. 7 and FIG. 8).

Additionally, as illustrated in FIG. 4, FIG. 6, and FIG. 7, the above-described stiffener 40 has: a reinforcing surface section 41 that is joined to the lower surface of the outer panel 10 by using the adhesive; and a rear-side fixed section 42 that extends rearward from this reinforcing surface section 41. The above-described rear-side fixed section 42 is fixed to the vicinity (at a proximity position) of the above-described ridgeline X1.

In this way, during normal time (non-collision time), the stiffener 40 is fixed to the vicinity of the ridgeline X1. Thus, it is configured to improve support rigidity of the outer panel 10 and thereby prevent deformation of the outer panel 10, for example, when a user touches the outer panel 10, or the like, to apply a downward load to the outer panel 10.

When an impact load is applied during pedestrian protection, it is configured to deform the ridgeline X1 via the stiffener 40, so as to further increase an energy absorption amount not only through energy absorption achieved by the deformation of the stiffener 40 but also by deformation of the inner panel 30.

That is, it is configured to simultaneously secure outer panel rigidity of the front portion of the outer panel 10 and pedestrian protection performance at a high level. In detail, in a plan view as illustrated in FIG. 4, the above-described reinforcing surface section 41 is formed in a substantially rectangular shape that is long in the vehicle width direction. As illustrated in FIG. 4, FIG. 6, and FIG. 7, beads 43, 44, each of which is projected downward, are integrally formed in a front portion and a rear portion of the reinforcing surface section 41, respectively. Each of these beads 43, 44 is designed to improve rigidity of the reinforcing surface section 41.

As illustrated in FIG. 4 and FIG. 6, folded sections 41a, 41b, 41c, 41d, each of which extends downward, are integrally formed on a front side, a rear side, and right and left lateral sides of the reinforcing surface section 41 that is formed in the substantially rectangular shape and formed to be laterally elongated in the plan view. Each of these folded sections 41a, 41b, 41c, 41d is designed to secure required rigidity of the reinforcing surface section 41.

In addition, as illustrated in FIG. 4 and FIG. 6, the plural rear-side fixed sections 42 described above are provided at spaced intervals in the vehicle width direction. In this embodiment, the five rear-side fixed sections 42 are provided. As illustrated in FIG. 6 and FIG. 7, the above-described rear-side fixed section 42 includes: a rear extending section 42a that extends rearward from the reinforcing surface section 41; a downward extending section 42c that extends downward (in detail, a rear and down direction) from a rear-side fixed section of this rear extending section 42a via a bent section 42b; and an attachment piece section 42d that extends rearward and upward from a lower end of the downward extending section 42c. The rear-side fixed section 42, which includes these elements 42a, 42b, 42c, 42d, is formed to extend in the front-rear direction in the plan view.

As illustrated in FIG. 6, on an upper surface of the above-described rear extending section 42a, a bead 42e is formed to be projected downward from the upper surface. In this way, it is configured to improve rigidity of the rear extending section 42a with this bead 42e.

In addition, as illustrated in FIG. 6, a bead 42f is formed in an inverted triangular shape in a side view. The bead 42f couples a lower portion of the downward extending section 42c, which is inclined in a front-high, rear-low state, and a front portion of the attachment piece section 42d, which is inclined in a front-low, rear-high state. In this way, it is configured to prevent deformation between the elements 42c, 42d with this bead 42f so as to secure load transmission performance.

Here, in the front-rear direction of the above-described rear extending section 42a, a substantially half portion on the front side is formed in an inverted U-shape that is opened downward in a cross section in the vehicle width direction. With this inverted U-shape structure, it is configured to improve the load transmission performance to the downward extending section 42c during the pedestrian protection.

As illustrated in FIG. 4 and FIG. 6, a front-side fixed section 45 is provided to extend forward from the reinforcing surface section 41. This front-side fixed section 45 includes: a forward extending section 45a that extends forward from the reinforcing surface section 41; a coupling section 45b that extends downward from a front end of the forward extending section 45a; and an attachment piece section 45c that extends forward from a lower end of the coupling section 45b. In the front-side fixed section 45, the forward extending section 45a, the coupling section 45b, and attachment piece section 45c are coupled in a substantially Z-shape in the side view.

As illustrated in FIG. 7, a vertical distance L2 between the attachment piece section 42d of the above-described rear-side fixed section 42 and the reinforcing surface section 41 is set to be longer than a vertical distance L1 between the attachment piece section 45c of the front-side fixed section 45 and the reinforcing surface section 41. That is, it is formed to satisfy a relational expression L2>L1.

In detail, it is formed such that the vertical distance L2 between the elements 41, 42d on a normal, which is orthogonal to a tangential line of the outer panel 10 opposing a rear end portion of the reinforcing surface section 41, is longer than the vertical distance L1 between the elements 41, 45c on a normal, which is orthogonal to a tangential line of the outer panel 10 opposing a front end portion of the reinforcing surface section 41.

In this way, it is configured that, during the pedestrian protection, moment that presses the rear-side fixed section 42 downward and rearward is generated with a front side on the reinforcing surface section 41 side of the rear-side fixed section 42 being an origin, a rotational force is generated by this moment to press and deform the inner panel 30 downward, and the energy absorption amount is thereby improved.

As illustrated in FIG. 2 and FIG. 4, the plural front-side fixed sections 45, each of which extends forward from the reinforcing surface section 41, are provided at spaced intervals in the vehicle width direction. In this embodiment, the five front-side fixed sections 45 are provided. As illustrated in FIG. 2 and FIG. 4, the above-described rear-side fixed sections 42 are respectively provided at the same positions as the front-side fixed sections 45 in the vehicle width direction. In other words, each of the rear-side fixed sections 42 is provided at a position to be aligned with the respective front-side fixed section 45 in the front-rear direction via the reinforcing surface section 41.

Just as described, the plural rear-side fixed sections 42 and the plural front-side fixed sections 45 are present at the same positions in the vehicle width direction. In this way, it is configured to reliably transmit the load to the rear-side fixed sections 42 during the pedestrian protection, so as to concentrate stress on the rear-side fixed sections 42.

As illustrated in FIG. 7, the above-described reinforcing surface section 41 is joined to the inner panel 30 via the bent section 42b in the rear portion of the reinforcing surface section 41. In detail, the reinforcing surface section 41 is joined to the vicinity of the ridgeline X1 of the inner panel 30, that is, the proximity position of the ridgeline X1 via the rear extending section 42a, the bent section 42b, the downward extending section 42c, and the attachment piece section 42d of the rear-side fixed section 42.

In this way, the reinforcing surface section 41 is provided to the inner panel portion, rigidity of which is improved by the ridgeline X1, via the bent section 42b. Thus, it is configured to prevent the deformation of the reinforcing surface section 41 and the outer panel 10 during the normal time.

As illustrated in FIG. 4, the plural rear-side fixed sections 42 described above are separated from each other in the vehicle width direction, and are formed such that the positions of the bent sections 42b in the front-rear direction in these plural rear-side fixed sections 42 match or substantially match each other in the vehicle width direction.

In this way, it is configured that, during the pedestrian protection, the load is transmitted to the attachment piece sections 42d of the rear-side fixed sections 42 via the bent sections 42b all at once to concentrate the stress on the vicinity of the ridgeline X1, the inner panel 30 is consequently deformed downward, and the energy absorption amount is thereby increased.

As illustrated in FIG. 5, the above-described inner panel 30 is formed with a joint seat surface 38, to which the rear-side fixed section 42, in detail, the attachment piece section 42d of the rear-side fixed section 42 is joined, in a continuous manner with the ridgeline X1 of the inner panel 30.

In this way, the joint seating surface 38 is connected to the ridgeline X1. Thus, it is configured to reliably transmit the load to the ridgeline X1 via the joint seat surface 38 during the pedestrian protection. In other words, it is configured to reliably transmit the load to the ridgeline X1 by making the joint seat surface 38 continue with the ridgeline X1.

In detail, as illustrated in FIG. 5, the above-described ridgeline X1 has an interrupted section 39 that is interrupted at a position of the joint seat surface 38. The joint seat surface 38 is provided on a virtual extension line of the ridgeline X1 in the interrupted section 39 of the ridgeline X1.

In this way, the load can further reliably be transmitted from the joint seat surface 38 to the ridgeline X1. Thus, it is configured to deform the ridgeline X1 via the stiffener 40 during the pedestrian protection, secure the energy absorption by the deformation of the inner panel 30 in addition to the energy absorption by the deformation of the stiffener 40, and thereby increase the energy absorption amount.

Here, the attachment piece section 42d in the rear-side fixed section 42 illustrated in FIG. 4 is welded to the joint seat surface 38 at a spot-welding point SW1 that is a spot-welded portion located substantially at a center of the joint seat surface 38 illustrated in FIG. 5.

Meanwhile, the attachment piece section 45c of the front-side fixed section 45 illustrated in FIG. 4 is welded to the stiffener support surface section 37 at a spot-welding point SW2 that is located in the stiffener support surface section 37 illustrated in FIG. 5. The spot-welding point SW2 located on the front side and the spot-welding point SW1 located on the rear side are provided at the substantially same position in the vehicle width direction.

FIG. 3 illustrates a hinge bracket 50 that is provided to each of right and left rear portions of the inner panel 30. FIG. 5 and FIG. 7 each illustrate a center bracket 51 that is provided at a center in the vehicle width direction of the front portion of the inner panel 30. Furthermore, FIG. 2 to FIG. 5 each illustrate a side bracket 52 that is provided close to each of right and left outer sides in the vehicle width direction in the front portion of the inner panel 30. In the drawings, an arrow F indicates a vehicle front direction, an arrow R indicates a vehicle rear direction, an arrow LE indicates the outer left side in the vehicle width direction, an arrow RI indicates the outer right side in the vehicle width direction, and an arrow UP indicates a vehicle up direction.

As it has been described so far, the hood structure for a vehicle according to this embodiment includes: the outer panel 10 that defines the external appearance; the inner panel 30 that is provided on the prime mover chamber 20 side of the outer panel 10; and the stiffener 40 that is provided in the front portion of the inner panel 30, the inner panel 30 has: the upper surface section 31 that is provided on the center side of the outer panel 10; the coupling surface section 32 that extends downward from the ridgeline X1 located at the peripheral edge of the upper surface section 31; and the lower surface section 33 that extends from the peripheral edge end of the coupling surface section 32 to the edge 10a side of the outer panel 10, the stiffener 40 has: the reinforcing surface section 41 that is joined to the outer panel 10; and the rear-side fixed section 42 that extends rearward from the reinforcing surface section 41, and the rear-side fixed section 42 is fixed to the vicinity of the ridgeline X1 (see FIG. 4 and FIG. 7).

According to such a hood structure for a vehicle, during a normal time (a non-collision time), the stiffener 40 is fixed to the vicinity of the ridgeline X1. Thus, for example, when the user touches the outer panel 10, or the like, to apply the downward load to the outer panel 10, the support rigidity of the outer panel 10 is improved, and the deformation of the outer panel 10 can be prevented.

Meanwhile, when the impact load is applied during pedestrian protection, the ridgeline X1 can be deformed via the stiffener 40. Thus, it is possible to increase the energy absorption amount not only through the energy absorption achieved by the deformation of the stiffener 40 but also by the deformation of the inner panel 30. That is, it is configured to simultaneously secure outer panel rigidity of the front portion of the outer panel 10 and pedestrian protection performance at the high level.

Such a hood structure for a vehicle also includes the front-side fixed section 45 that extends forward from the reinforcing surface section 41. The hood structure for a vehicle is formed such that the vertical distance L2 between the rear-side fixed section 42 and the reinforcing surface section 41 is longer than the vertical distance L1 between the front-side fixed section 45 and the reinforcing surface section 41 (see FIG. 7).

According to such a hood structure for a vehicle, during pedestrian protection, the moment that presses the rear-side fixed section 42 downward and rearward is generated with the front side on the reinforcing surface section 41 side of the rear-side fixed section 42 being the origin, and the rotational force is generated by this moment. Thus, it is possible to promote the deformation of the inner panel 30 by pressing the inner panel 30 downward. Therefore, it is possible to increase the energy absorption amount.

Furthermore, in such a hood structure for a vehicle, the rear-side fixed section 42 is provided at the same position as the front-side fixed section 45 in the vehicle width direction (see FIG. 2 and FIG. 4). According to such a hood structure for a vehicle, the rear-side fixed section 42 and the front-side fixed section 45 are present at the same position in the vehicle width direction. Therefore, it is possible to reliably transmit the load to the rear-side fixed section 42 during pedestrian protection, so as to concentrate the stress on the rear-side fixed section 42.

Moreover, in such a hood structure for a vehicle, the reinforcing surface section 41 is joined to the inner panel 30 via the bent section 42b in the rear portion of the reinforcing surface section 41 (see FIG. 6 and FIG. 7). According to such a hood structure for a vehicle, the reinforcing surface section 41 is provided to the inner panel portion, the rigidity of which is improved by the ridgeline X1, via the bent section 42b. Therefore, it is possible to prevent the deformation of the reinforcing surface section 41 and the outer panel 10 during the normal time.

In such a hood structure for a vehicle, the plural rear-side fixed sections 42 are separated from each other in the vehicle width direction and are formed such that the positions of the bent sections 42b in the front-rear direction in these plural rear-side fixed sections 42 match each other in the vehicle width direction (see FIG. 4).

According to such a hood structure for a vehicle, during pedestrian protection, the load is transmitted to the rear-side fixed sections 42 (in detail, see the attachment piece sections 42d) via the bent sections 42b all at once. Thus, it is possible to concentrate the stress on the vicinity of the ridgeline X1. In this way, it is possible to increase the energy absorption amount by stably deforming the inner panel 30 downward.

In such a hood structure for a vehicle, the joint seat surface 38, to which the rear-side fixed section 42 is joined, is formed to continue with the ridgeline X1 of the inner panel 30 (see FIG. 5). According to such a hood structure for a vehicle, the joint seating surface 38 is connected to the ridgeline X1. Thus, it is possible to reliably transmit the load to the ridgeline X1 via the joint seat surface 38 during pedestrian protection. In other words, it is possible to reliably transmit the load to the ridgeline X1 by making the joint seat surface 38 continue with the ridgeline X1.

Furthermore, in such a hood structure for a vehicle, the ridgeline X1 has the interrupted section 39 that is interrupted at the position of the joint seat surface 38, and the joint seat surface 38 is provided on the virtual extension line of the ridgeline X1 in the interrupted section 39 of the ridgeline X1 (see FIG. 5).

According to such a hood structure for a vehicle, the load can further reliably be transmitted from the joint seat surface 38 to the ridgeline X1. Therefore, it is possible to deform the ridgeline X1 via the stiffener 40 during pedestrian protection, secure the energy absorption by the deformation of the inner panel 30 in addition to the energy absorption by the deformation of the stiffener 40, and thereby increase the energy absorption amount.

In correspondence between the configuration in the present disclosure and the above-described embodiment, the outer panel in the present disclosure corresponds to the outer panel 10 in the embodiment. Similarly, the edge of the outer panel corresponds to the edge 10a, the prime mover chamber corresponds to the prime mover chamber 20, the inner panel corresponds to the inner panel 30, the upper surface section corresponds to the upper surface section 31, the coupling surface section corresponds to the coupling surface section 32, the lower surface section corresponds to the lower surface section 33, the joint seat surface corresponds to the joint seat surface 38, the interrupted section corresponds to the interrupted section 39, the stiffener corresponds to the stiffener 40, the reinforcing surface section corresponds to the reinforcing surface section 41, the rear-side fixed section corresponds to the rear-side fixed section 42, the front-side fixed section corresponds to the front-side fixed section 45, the bent section corresponds to the bent section 42b, the ridgeline corresponds to the ridgeline X1, the vertical distance between the rear-side fixed section and the reinforcing surface section corresponds to the vertical distance L2, and the vertical distance between the front-side fixed section and the reinforcing surface section corresponds to the vertical distance L1. However, the present disclosure is not limited to the configuration in the above-described embodiment.

For example, the number of each of the rear-side fixed section 42 and the front-side fixed section 45 may be plural and other than five.

As it has been described above, the present disclosure is useful for the hood structure for a vehicle, the hood structure including the outer panel that defines the external appearance, the inner panel that is provided on the prime mover chamber side of the outer panel, and the stiffener that is provided to the front portion of the inner panel.

What is claimed is:

1. A hood structure for a vehicle, the hood structure comprising:
an outer panel that defines external appearance;
an inner panel on a prime mover chamber side of the outer panel; and
a stiffener in a front portion of the inner panel, wherein the inner panel has:
an upper surface section located on a center side of the outer panel;
a coupling surface section that extends downward from a ridgeline located at a peripheral edge of the upper surface section; and
a lower surface section that extends from a peripheral edge end of the coupling surface section to an edge side of the outer panel,
the stiffener has:
a reinforcing surface section that is joined to the outer panel; and
a rear-side fixed section that extends rearward from the reinforcing surface section, the rear-side fixed section is fixed to the vicinity of the ridgeline, a joint seat surface, to which the rear-side fixed section is joined, is continuous with the ridgeline of the inner panel, the ridgeline has an interrupted section that is interrupted at a position of the joint seat surface, and the joint seat surface is disposed on a virtual extension line of the ridgeline in the interrupted section of the ridgeline.

2. The hood structure for a vehicle according to claim 1 further comprising:

a front-side fixed section that extends forward from the reinforcing surface section, wherein the front-side fixed section is formed such that a vertical distance between the rear-side fixed section and the reinforcing surface section is longer than a vertical distance between the front-side fixed section and the reinforcing surface section.

3. The hood structure for a vehicle according to claim 2, wherein the rear-side fixed section is disposed at the same position as the front-side fixed section in a vehicle width direction.

4. The hood structure for a vehicle according to claim 3, wherein the reinforcing surface section is joined to the inner panel via a bent section in a rear portion of the reinforcing surface section.

5. The hood structure for a vehicle according to claim 4, wherein the plural rear-side fixed sections are separated from each other in the vehicle width direction, and are formed such that positions of the bent sections in the plural rear-side fixed sections match each other.

6. The hood structure for a vehicle according to claim 1, wherein the rear-side fixed section is disposed at the same position as the front-side fixed section in a vehicle width direction.

7. The hood structure for a vehicle according to claim 1, wherein the reinforcing surface section is joined to the inner panel via a bent section in a rear portion of the reinforcing surface section.

8. The hood structure for a vehicle according to claim 2, wherein the reinforcing surface section is joined to the inner panel via a bent section in a rear portion of the reinforcing surface section.

9. The hood structure for a vehicle according to claim 6, wherein the reinforcing surface section is joined to the inner panel via a bent section in a rear portion of the reinforcing surface section.

10. The hood structure for a vehicle according to claim 7, wherein the plural rear-side fixed sections are separated from each other in the vehicle width direction, and are formed such that positions of the bent sections in the plural rear-side fixed sections match each other.

11. The hood structure for a vehicle according to claim 8, wherein the plural rear-side fixed sections are separated from each other in the vehicle width direction, and are formed such that positions of the bent sections in the plural rear-side fixed sections match each other.

12. The hood structure for a vehicle according to claim 9, wherein the plural rear-side fixed sections are separated from each other in the vehicle width direction, and are formed such that positions of the bent sections in the plural rear-side fixed sections match each other.

* * * * *